G. H. W. DOOSE.
FISH HOOK.
APPLICATION FILED DEC. 23, 1910.
1,012,528.
Patented Dec. 19, 1911.
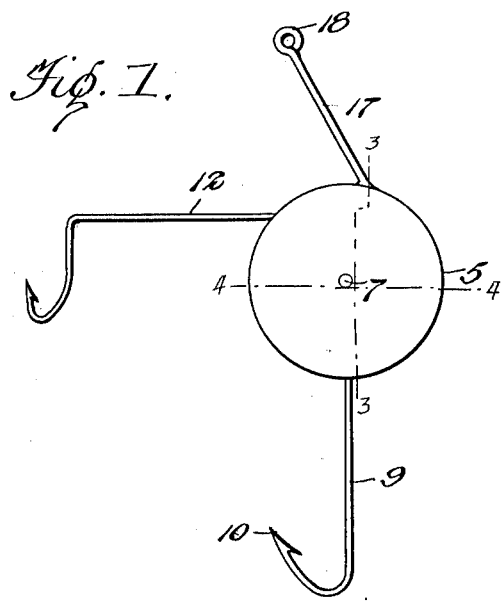
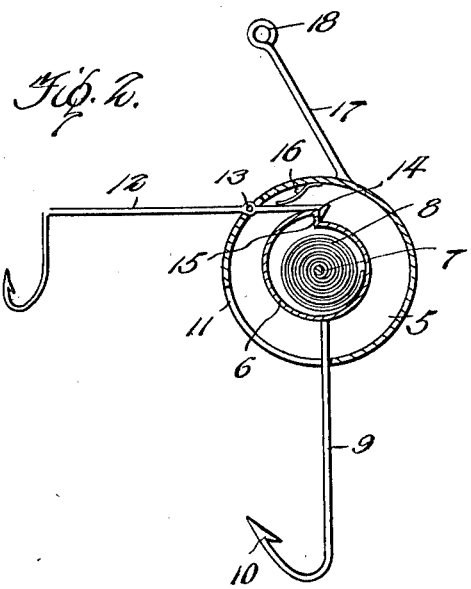
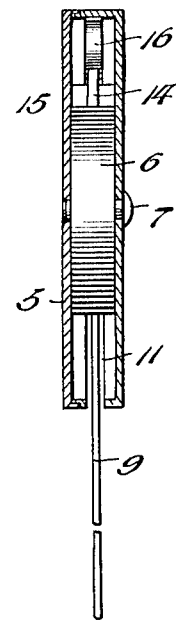
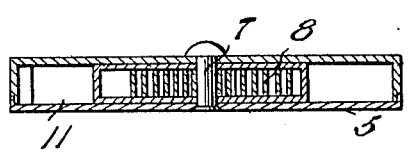
Inventor
Gabriel H. W. Doose
Witnesses
By Victor J. Evans
Attorney or hook. Projecting upwardly from the shell or casing and suitably fixed thereto is a forwardly inclined stem 17, the latter terminating at its free end in an eye 18, to which is connected a cast line (not shown).

UNITED STATES PATENT OFFICE.

GABRIEL H. W. DOOSE, OF SAN FRANCISCO, CALIFORNIA.

FISH-HOOK.

1,012,528.   Specification of Letters Patent.   Patented Dec. 19, 1911.

Application filed December 23, 1910. Serial No. 598,892.

*To all whom it may concern:*

Be it known that I, GABRIEL H. W. DOOSE, a citizen of the United States, residing at San Francisco, in the county of San Francisco and State of California, have invented new and useful Improvements in Fish-Hooks, of which the following is a specification.

The invention relates to fish hooks, and more particularly to the class of trap fish hooks.

The primary object of the invention is the provision of a fish hook in which the bait support when pulled upon will automatically release the catch hook, thereby trapping the fish, animal or the like.

Another object of the invention is the provision of a hook of this character in which the bait support and catching prong are normally held separated and are adapted to approach one another on the bait support being attacked by a fish, animal, or the like, thus assuring the trapping thereof.

A further object of the invention is the provision of a hook in which the trapping parts thereof are automatically operated for catching and holding fast a fish, animal or the like thereby.

A still further object of the invention is the provision of a hook of the character described which is simple in construction, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claims hereunto appended.

In the drawings: Figure 1 is a side elevation of a hook constructed in accordance with the invention. Fig. 2 is a similar view with the casing broken away. Fig. 3 is a sectional view on the line 3—3 of Fig. 1. Fig. 4 is a sectional view on the line 4—4 of Fig. 1.

Similar reference characters indicate corresponding parts throughout the several views of the drawings.

Referring to the drawings by numerals, the hook comprises a circular-shaped hollow shell or casing 5, in which is centrally arranged a rotatable hollow hub 6, the latter being connected to the casing 5 by means of a pivot 7, to which is connected one end of a coiled clock spring 8, the opposite end of which is connected to the said hub, whereby the latter may be tensioned, for a purpose as will be hereinafter more fully described. Secured to or integral with the periphery of the hub is a downwardly projecting main hook 9, the same being formed with the usual bill 10, the main hook 9 working in a suitable elongated slot 11 formed in the periphery of the casing 5.

At right angles to the set position of the main hook 9 is an auxiliary hook or bait support 12, the same being connected in a suitable opening in the casing 5 by means of a pivot 13 and has formed in its inner end a catch terminal 14, the same being adapted to normally engage a nose 15 projecting outwardly from the periphery of the rotatable hub 6, so as to hold the said slot passive against the resistance of the spring 8 therein. Working against the inner end of the auxiliary hook or bait support 12 is a leaf spring 16, the same being suitably fixed to the casing 5 interiorly thereof, so as to hold the catch terminal 14 in the path of movement of the nose 15, thereby locking the hub 6 against rotation until the auxiliary hook or bait support 12 is pulled upon, which will cause the disengagement of the catch terminal 14 from the nose 15 thereby permitting the bill 10 of the main hook 9 to move upwardly and in this manner approach the auxiliary hook or bait support 12 for the catching of a fish and retaining it fast upon the main hook.

Projecting upwardly from the shell or casing 5 and suitably fixed thereto is a forwardly inclined stem 17, the latter terminating at its free end in an eye 18, to which is connected a cast line (not shown).

What is claimed is:

1. A fish hook, comprising a circular-shaped hollow casing having an arm arranged tangentially thereon and terminating in an eye, a rotatable spring actuated drum journaled centrally within the casing and having an offset forming a shoulder in its periphery, a bait hook pivoted to the periphery of the casing intermediate its ends and having an inner hook end normally engaging the shoulder on the periphery of the drum to hold the latter under tension, a main hook fixed to the drum and projecting exteriorly of the casing normally at right angles to the bait hook and adapted to arcuately swing in the direction of the latter on the disengagement of said bait hook from the drum.

2. A fish hook, comprising a circular-shaped hollow casing having an arm arranged tangentially thereon and terminating in an eye, a rotatable spring actuated drum journaled centrally within the casing and having an offset forming a shoulder in its periphery, a bait hook pivoted to the periphery of the casing intermediate its ends and having an inner hook end normally engaging the shoulder on the periphery of the drum to hold the latter under tension, a main hook fixed to the drum and projecting exteriorly of the casing normally at right angles to the bait hook and adapted to arcuately swing in the direction of the latter on the disengagement of said bait hook from the drum, the said hooks being provided with bills which are in the same direction with respect to each other.

In testimony whereof I affix my signature in presence of two witnesses.

GABRIEL H. W. DOOSE.

Witnesses:
CHARS MAYR,
HENRY J. CORNELLS.

Copies of this patent may be obtained for five cents each, by addressing the "Commissioner of Patents, Washington, D. C."